(12) United States Patent
McKee et al.

(10) Patent No.: US 6,663,525 B1
(45) Date of Patent: Dec. 16, 2003

(54) HYDRO-MECHANICAL TRANSMISSION WITH AUTOMATIC BRAKING CAPABILITY AND METHOD OF OPERATION

(75) Inventors: Kevin D. McKee, Naperville, IL (US); Jimmie Clifford, Bettendorf, IA (US); Patrick Dinnon, Blue Grass, IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/196,921

(22) Filed: Jul. 17, 2002

(51) Int. Cl.[7] .............................................. F16H 47/04
(52) U.S. Cl. .............................. 475/72; 475/78; 475/83
(58) Field of Search .............................. 475/72, 73, 76, 475/78, 83, 79, 80, 81, 82

(56) References Cited

U.S. PATENT DOCUMENTS

| | | | |
|---|---|---|---|
| 2,806,389 A | | 9/1957 | Rosenthal et al. ............. 74/789 |
| 3,665,788 A | * | 5/1972 | Nyman ......................... 475/72 |
| 3,736,813 A | * | 6/1973 | Kress et al. ................... 475/82 |
| 4,019,404 A | * | 4/1977 | Schauer ........................ 475/82 |
| 4,181,042 A | * | 1/1980 | Rau et al. ..................... 475/138 |
| 4,360,999 A | | 11/1982 | Seyerle ......................... 56/11.3 |
| 5,102,376 A | | 4/1992 | Batt ............................. 475/72 |
| 5,478,292 A | | 12/1995 | Sato et al. .................... 475/293 |
| 5,518,461 A | * | 5/1996 | Pfordt .......................... 475/72 |
| 5,667,452 A | * | 9/1997 | Coutant ........................ 475/81 |
| 5,788,596 A | | 8/1998 | Robinson et al. ............. 475/118 |
| 6,247,295 B1 | * | 6/2001 | Hansen et al. ........... 56/10.2 A |
| 6,358,174 B1 | * | 3/2002 | Folsom et al. ................ 475/72 |

* cited by examiner

*Primary Examiner*—Tisha D Lewis
(74) *Attorney, Agent, or Firm*—John William Stader; Rebecca L. Henkel

(57) ABSTRACT

The transmission includes a planetary gear arrangement having a rotatable output, a first rotatable input connected to an output of a fluid motor, and a second rotatable input connected to a clutch or other device engageable or operable for connecting the second input to a rotatable mechanical power source. The transmission includes a fluid operated brake or other device engageable or operable when fluid therein is pressurized for connecting the second input of the gear arrangement to a fixed member for preventing rotation of the second input. When the transmission is placed or moved into a neutral operating state or condition, the fluid brake or other device is automatically engaged or operated to prevent rotation of the second input, and flow of pressurized fluid through the fluid motor is automatically prevented, such that driving rotation of the output of the transmission is prevented. Then, when the fluid brake or other device is depressurized, the transmission output can be manually rotated.

20 Claims, 3 Drawing Sheets

HYDRO-MECHANICAL TRANSMISSION WITH AUTOMATIC BRAKING CAPABILITY AND METHOD OF OPERATION

TECHNICAL FIELD

This invention relates generally to a hydro-mechanical transmission for a machine such as an agricultural combine or the like, and more particularly, to a hydro-mechanical transmission which, when in a neutral condition or state and fluid pressure is present, prevents or brakes driven rotation of the transmission output to limit undesired powered rotation of a rotatable operating element or elements connected thereto, but which preferably does not provide such braking effect when the fluid pressure is not present, thereby allowing manual rotation of the operating element or elements, as desired or required.

BACKGROUND ART

Currently, in known hydro-mechanical transmissions utilizing a mechanical power source and a fluid power source for operating rotatable elements, such as rotors, feeders and the like, of agricultural machines such as combines and the like, when placing the transmission in a neutral condition, it is typical to disengage a clutch connecting the mechanical power source to the transmission and move the variable pump or motor of the fluid power source to a zero displacement position, to break the power paths to the rotatable element or elements. However, a problem that has been observed, is that even though the clutch between the mechanical power source and the transmission is disengaged, as a result of normally present viscous drag, there may be sufficient hydraulic coupling or interaction between the clutch faces such that the mechanical input to the transmission is still driven to some extent. This condition may be more likely when the fluid is cold, such as when the engine is first started. As a result, the transmission output may be rotated, thus undesirably rotating the rotatable element or elements connected thereto. Particularly for the rotor and the feeder of an agricultural combine, it would be desirable to automatically prevent such inadvertent rotation, while still allowing manually rotating those elements when power to the transmission is not present, for inspection, service, installation, and the like.

It is long known to provide mechanical means for braking the rotation of an output of a transmission of an agricultural machine when disconnected from a power source. Reference in this regard, Rosenthal et al. U.S. Pat. No. 2,806,389 issued Sep. 17, 1957 to International Harvester Company, which discloses a power take-off mechanism for tractors including mechanical braking means which can be utilized for preventing rotation of an output of the mechanism when disconnected from a power source on the tractor. However, a resultant limitation of this mechanism is that the braking means must first be released for allowing manually or otherwise rotating the output and any rotatable elements connected thereto when input power is not present which would be undesirable for a rotor and feeder application as discussed above.

Accordingly, what is sought is a hydro-mechanical transmission for a machine such as an agricultural combine which provides an automatic output braking capability when in a neutral condition or state, but which still allows manual rotation of the transmission output and rotational elements connected thereto when input fluid power is not present.

SUMMARY OF THE INVENTION

According to the present invention, a hydro-mechanical transmission which provides an automatic braking capability as sought above, is disclosed. The preferred transmission includes a planetary gear arrangement having a rotatable output, a first rotatable input connected to an output of a fluid motor drivingly rotatable by passage of a flow of pressurized fluid therethrough, and a second rotatable input connected to a clutch or other suitable device engageable or operable for rotatably drivingly connecting the second input to a rotatable output of a mechanical power source, such as a gear box connected to an internal combustion engine. The transmission includes a fluid operated clutch, brake or other suitable device engageable or operable when fluid therein is pressurized for connecting the second input of the gear arrangement to a fixed member, such as a fixed frame or housing containing or supporting the gear arrangement, for preventing rotation of the second input. When the transmission is placed or moved into a neutral operating state or condition, the first clutch or other device is automatically disengaged or operated so as to disconnect the output of the mechanical power source from the second rotatable input of the gear arrangement, and at the same time, or in a desired sequence, the fluid clutch or brake or other device is automatically engaged or operated to connect the second rotatable input to the fixed member to prevent rotation of the second input, and passage of any flow of pressurized fluid through the fluid motor for drivingly rotating the motor is automatically prevented while or when the output of the mechanical power source is disconnected from the second input of the gear arrangement and the second input is connected to the fixed member, such that driving rotation of the output of the transmission is prevented.

A control for the transmission can include conventional fluid valving controlled by operator movable levers and/or handles, and/or an electronic control including a processor, operable for placing the transmission in the neutral operating state or condition upon receipt of a predetermined input representative of the neutral state or condition. The fluid motor can receive the pressurized fluid from any suitable source thereof, such as a fluid pump connected to the motor in a hydrostatic loop, either the motor or the pump having a variable displacement that can be zeroed for preventing pressurized fluid flow to or through the motor. Alternatively, a suitable pressure relief device can be provided in connection with the motor or elsewhere in the fluid connection thereto for depressurizing or otherwise preventing pressurized fluid flow thereto.

The present transmission has particular application for driving rotatable elements of agricultural combines, such as conveyor apparatus of a feeder thereof, and/or the threshing rotor or rotors thereof.

Advantageously, when the fluid in the fluid operated brake or other device is depressurized, the second input of the planetary gear arrangement is released from the fixed member, to allow manual rotation of the transmission output and rotatable elements connected thereto, such as a feed conveyor, rotor or rotors, to allow for installing, inspecting, or servicing the rotatable element or elements.

DETAILED DESCRIPTION OF THE INVENTION

Figure 1:
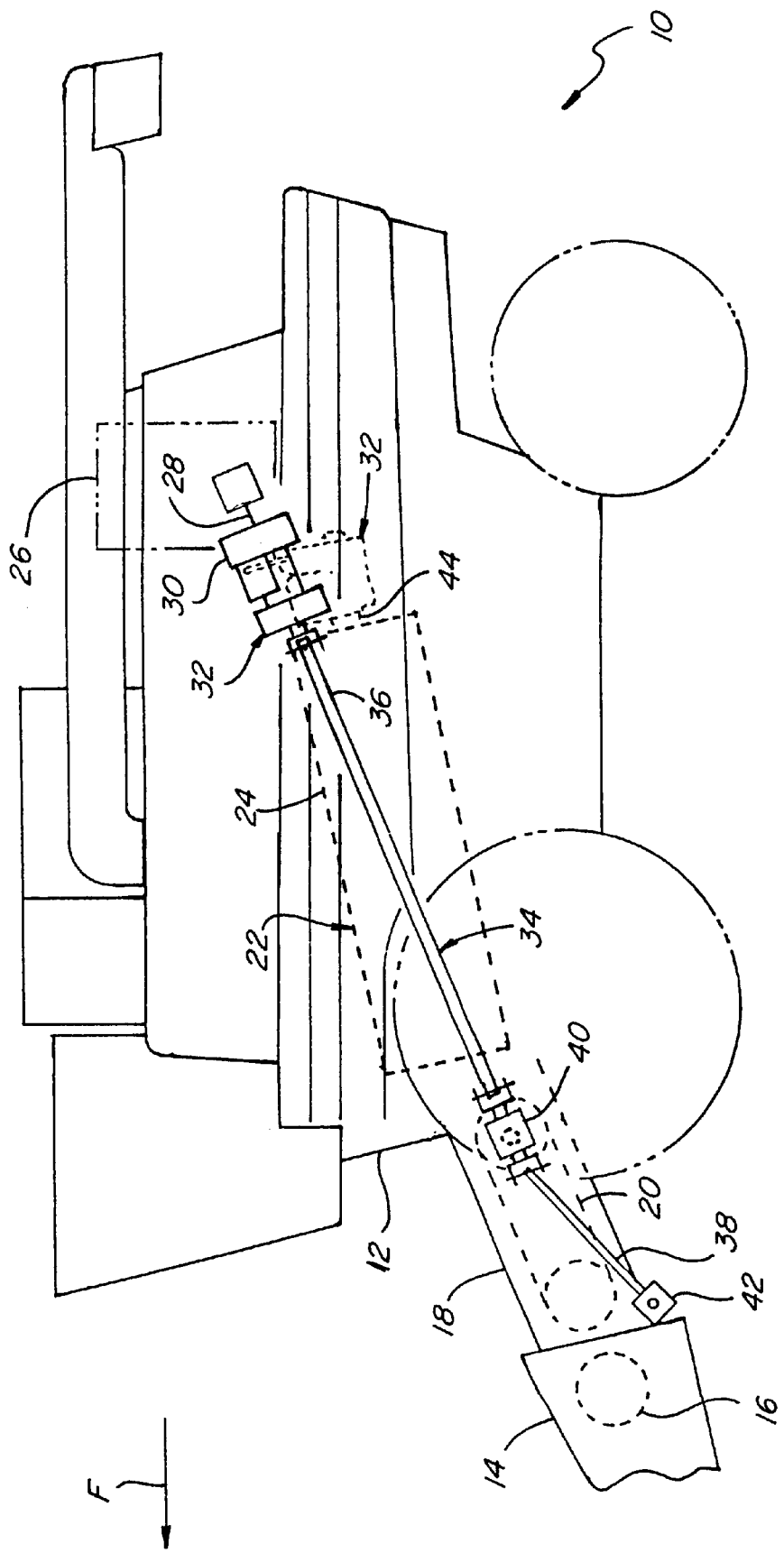
FIG. 1 is a simplified side elevational view of an agricultural combine including a hydro-mechanical transmission with automatic braking capability according to the present invention.

Referring now to the drawings, in FIG. 1, a self-propelled agricultural combine 10 movable in the forward direction, denoted by arrow F, for harvesting and separating crops, such as, but not limited to, grains including rice, wheat, soybeans, and corn, is shown. Combine 10 includes a forward end 12 carrying a conventional header 14 extending transversely thereacross in close proximity to the ground and including rotating and/or reciprocating elements (not shown) operable for gathering and cutting or otherwise separating crop materials or desired portions thereof from root structure in the ground. Header 14 includes additional rotatable elements, represented by element 16, for conveying the cut or separated crop materials to a feeder 18 including rotatable elements represented by conveyor 20 for conveying the plant material to a separator or threshing mechanism 22 including a rotatable rotor 24 which separates the grains or other crops from the other plant material and foreign material, the crops either being temporarily collected in a bin on combine 10 or discharged to an accompanying wagon or truck (not shown). Combine 10 is propelled by a conventional power plant such as an internal combustion engine 26 and a hydraulic and/or mechanical drive train (not shown) in the well known conventional manner.

Figure 2:
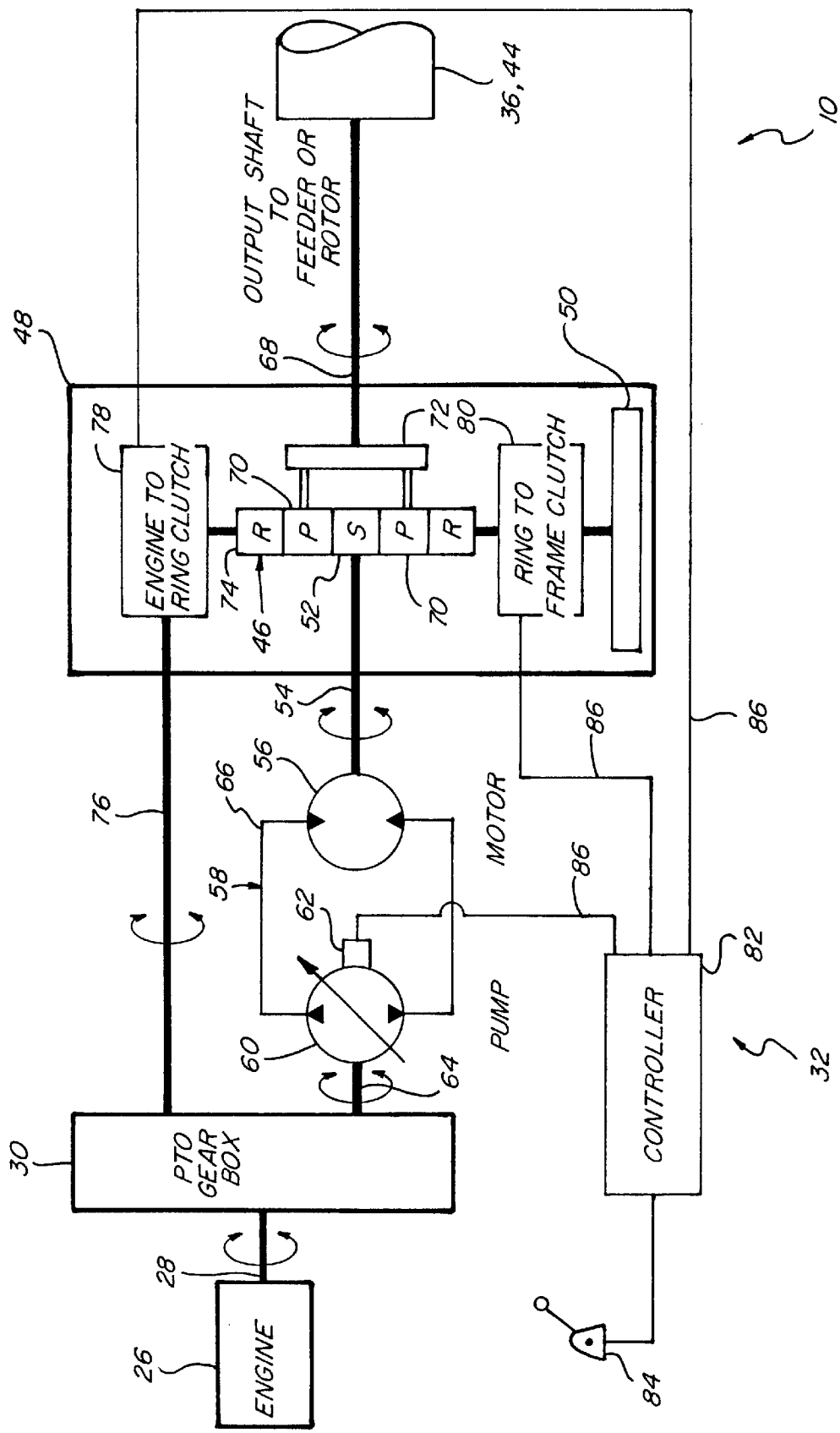
FIG. 2 is a simplified schematic representation of the transmission of FIG. 1 and aspects of related drive apparatus.

Also referring to FIG. 2, engine 26 is rotatably drivingly connected by an output 28 to at least one power takeoff (PTO) gear box 30 for transmitting power to rotatable elements of combine 10, including, but not limited to, rotatable elements 16 and other movable elements of header 14, and conveyor 20 of feeder 18, as well as rotor 24 of threshing mechanism 22. PTO gear box 30 includes a plurality of drivingly rotatable outputs for connection to at least one transmission controllably operable for drivingly rotating selected ones of the rotatable elements of header 14, feeder 18, and/or threshing mechanism 22, including, but not limited to, rotatable element 16, conveyor 20, and rotor 24 shown. In FIG. 1, a first transmission 32 is shown rotatably drivingly connected to conveyor 20 of feeder 18 and to the rotatable elements of header 14, represented by rotatable element 16, by a drive line 34, including among other elements, a drive shaft 36, a transfer shaft 38, and gear boxes 40 and 42. The second transmission 32 is shown connected by a drive shaft 44 or other suitable coupling device to rotor 24 of threshing mechanism 22. It should be understood that each of transmissions 32 could be alternatively connected to the various rotatable elements of header 14, feeder 18, and threshing mechanism 22 in a variety of manners and using a variety of connecting drives, including, but not limited to, belt and/or chain drives, as desired and without departing from the scope of the invention.

Referring more particularly to FIG. 2, a representative one of transmissions 32 is shown operatively connected between PTO gear box 30 and either drive shaft 36 or drive shaft 44. Transmission 32 includes a planetary gear set or arrangement 46 conventionally supported and contained in a gear box 48 which contains and fixedly supports a fixed frame 50. Gear arrangement 46 includes a first rotatable input 52 which is preferably a sun gear of arrangement 46, denoted at S, connected to a rotatable output 54 of a fluid motor 56 of a hydro-static drive 58. Hydro-static drive 58 also includes a variable displacement fluid pump 60 of conventional construction and operation, including an internal swash plate (not shown) controllably movable by an external control 62 to at least one position displaced from a zero position such that when an output 64 connected to PTO gear box 30 is rotated, pressurized fluid will be pumped by pump 60 through a fluid path 66 through motor 56 for drivingly rotating output 54 thereof in the usual manner.

Gear arrangement 46 includes a rotatable output 68 including a plurality of planet gears 70, denoted at P, enmeshed with the sun gear S of input 52, planet gears 70 being mounted for rotation on a carrier 72. Output 68 is rotatably connected to either drive shaft 36 or drive shaft 44, depending on the rotatable elements the transmission is to drive. Gear arrangement 46 includes a second rotatable input 74 which preferably includes the ring gear, denoted at R, of gear arrangement 46 extending around and enmeshed with planet gears 70. Second rotatable input 74 is rotatably connectable to another drivingly rotatable output 76 of PTO gear box 30, by operation or engagement of a suitable device 78 which is preferably a conventional engine to ring clutch as shown.

Importantly, transmission 32 includes a fluid operated device 80 which is preferably a conventional ring to frame clutch or brake conventionally connected to a source of pressurized fluid (not shown), operable or engageable for connecting second input 74 to a fixed object such as frame 50 for preventing rotation of input 74. Devices 78 and 80 are conventionally operable for controlling rotation of second input 74 as first input 52 is rotated at a constant or variable speed as controlled by fluid pump 60, for controllably rotating output 78 of gear arrangement 46, and thus drive shaft 36 or 44 and any rotatable element or elements connected thereto, at a desired rotational speed.

Operation of control 62 of pump 60 for varying the displacement thereof between zero and the one or more displacement values thereof; of device 78 for connecting and disconnecting second input 74 and output 76 of gear box 30; and of fluid device 80 for connecting and disconnecting second input 72 and frame 50, can be accomplished by any suitable controller or controllers, as represented by controller 82. Controller 82 can include one or more fluid valves and/or microprocessors, and is controllable by an operator input drive 84, such as a control lever or handle, a switch, or the like. Controller 82 can be connected to control 62, device 78, and device 80 in any suitable conventional manner, such as by one or more fluid control lines, conductive paths, or the like, as represented by lines 86 as shown, for communicating control signals to control 62 and devices 78 and 80 in the conventional, well known manner. Correspondingly, control 62 and devices 78 and 80 can include conventional solenoids or other actuators operable using electrical control signals in the well known conventional manner or fluid controlled valves, also in the well known, conventional manner as required. As set forth above, device 80 is preferably a conventional fluid clutch or brake operable when pressurized fluid is delivered thereto for connecting input 74 to frame 50, and in the absence of the delivery of the pressurized fluid, to release and disconnect input 74 from the frame.

An important feature of transmission 32 provided according to the teachings of the present invention, is the ability to prevent driven rotation of output 68 of gear arrangement 46 and thus drive shaft 36 or 44 and any rotatable elements connected thereto, when transmission 32 is placed in or moved to a neutral condition or state. In the past, when using a fluid operated clutch such as device 78 for connecting input 74 of gear arrangement 46 to output 76 of PTO gear box 30, when the clutch was disengaged, due to viscous action of fluid disposed between the adjacent faces of the clutch, input 74 could be undesirably drivingly rotated by rotation of output 76, to at least some extent. To prevent this occurrence according to the present invention, when transmission 32 is placed in or moved to a neutral condition, for instance, by movement of operator input device 84 to a neutral position, controller 82 controllably operates device 78 to disconnect input 74 from output 76; operates device 80 to connect input 74 to fixed frame 50 to prevent rotation of input 74; and operates control 62 so as to zero displacement of fluid pump 60 to cease or otherwise prevent or stop pressurized flow of fluid through fluid motor 56. This latter step prevents driven rotation of output 54 of motor 56 and thus first input 52 of gear arrangement 46, which, with the holding of input 74 to frame 50, prevents rotation of gear arrangement 46 and thus output 68 and drive shaft 36 or 44 connected thereto. As a result, rotation of the rotatable element or elements connected to the respective drive shaft 36 or 44 is prevented.

As another feature or advantage, when no pressurized fluid is present in fluid device 80, or fluid therein is depressurized, second input 74 is released or disconnected from frame 50 and is thus now rotatable, which allows manual rotation of planet gears 70, carrier 72 and importantly output 68, as desired or required, for such purposes as to allowing installing or aligning shaft 36 or 44 to output 68, and rotating any rotatable element or elements connected to shaft 36 or 44, such as rotatable element 16 of header 14, conveyor 20 of feeder 18, or rotor 24 of threshing mechanism 22 (all shown in FIG. 1) for inspection and/or service.

Figure 3:
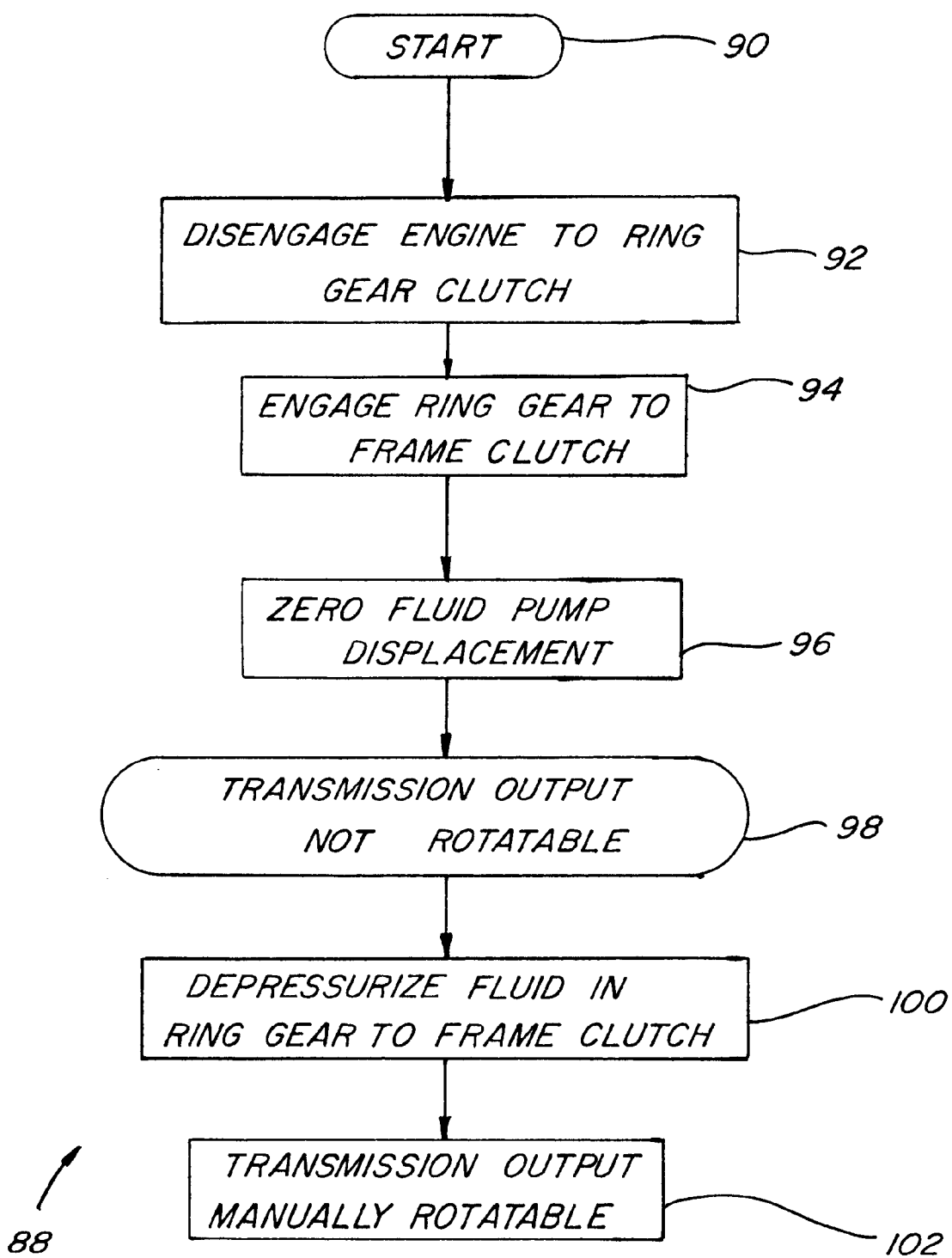
FIG. 3 is a high level flow diagram showing steps of a method of operation of the transmission of FIGS. 1 and 2.

Referring also to FIG. 3, a high level flow diagram 88 of preferred steps of operation of transmission 32 for placing it in or moving it to a neutral condition or state when a predetermined input is received, is shown. Referring to FIG. 3, receipt of the input signal is represented by start block 90. Again, the input signal can be a manual signal generated by a suitable manual operator input including valves, levers or the like, or an electrical signal as generated by a switch or the like, as desired. When controller 82 receives the signal, device 78 which is preferably a engine to ring gear clutch, is disengaged, as denoted in block 92. Simultaneously, or in a desired sequence with this step, device 80, which is preferably a fluid clutch or brake, is engaged or operated to connect the ring gear of gear arrangement 46 to frame 50, as denoted by block 94. At block 96, controller 82 sends a signal to control 62 of fluid pump 60 to move the swash plate thereof to a zero displacement, such that pressurized fluid does not pass through or is otherwise prevented from driving fluid motor 56 and, as a result, output 54 and first input 52 of gear arrangement 46 are not rotated. This step can also be simultaneously or in a desired sequence with the other steps denoted by blocks 92 and 94. As a result, output 68 is rendered not rotatable, as denoted at block 98.

Subsequently, as an optional step, fluid in device 80, which is preferably a fluid operated ring gear to frame clutch, can be depressurized, as denoted at block 100, thereby allowing rotation of input 74, planet gears 70, carrier 72, and thus output 68, manually, by rotation of the rotatable element or elements connected thereto by drive shaft 36 or 44.

Here, as an alternative construction, it should be noted that the first input and the output of gear arrangement 46 can be reversed, such that the first input includes carrier 72 and planet gears 70, and the output can include the sun gear, as desired or preferred for a particular application.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a hydro-mechanical transmission including a planetary gear arrangement having a rotatable output, a first rotatable input connected to an output of a fluid motor drivingly rotatable by passage of a flow of pressurized fluid therethrough, and a second rotatable input connected to a clutch engageable for rotatably drivingly connecting the second rotatable input to a rotatable output of a mechanical power source, and a fluid operated brake engageable when fluid therein is pressurized for connecting the second rotatable input to a fixed member for preventing rotation of the second rotatable input, an improved method for placing the transmission in a neutral operating state comprising the steps of:

automatically disengaging the clutch so as to disconnect the rotatable output of the mechanical power source from the second rotatable input;

automatically engaging the fluid brake so as to connect the second rotatable input to the fixed member to prevent rotation of the second rotatable input; and automatically preventing the passage of the flow of pressurized fluid through the fluid motor so as to prevent the driving rotation thereof when the clutch is disengaged and the fluid brake is engaged, such that driving rotation of an output of the transmission is prevented.

2. In the transmission of claim 1, the step of automatically preventing the passage of the flow of the pressurized fluid through the fluid motor comprising bringing a displacement of a variable displacement fluid pump connected to the motor for supplying the pressurized fluid thereto to a zero value.

3. In the transmission of claim 2, the improvement comprising the subsequent step of automatically depressurizing any fluid in the brake when the clutch is disengaged and passage of the pressurized fluid through the fluid motor is prevented, so as to release the brake for allowing manually rotating the output of the transmission.

4. In the transmission of claim 1, the second rotatable input comprising a ring gear of the planetary gear arrangement, and the fixed member comprising a fixed frame member of the transmission, such that the step of engaging the fluid brake so as to connect the second rotatable input to the fixed member to prevent rotation of the second rotatable input comprises connecting the ring gear to the frame member.

5. In the transmission of claim 1, the fluid motor being connected in fluid communication with a variable displacement fluid pump rotatably driven by the mechanical power source, and the improvement comprising automatically changing said displacement to a value so as to prevent delivery of a flow of pressurized fluid to the fluid motor when the clutch is disengaged and the fluid brake is engaged.

6. In the transmission of claim 1, the improvement further comprising the step of providing a controller operable when a predetermined input signal representative of a neutral condition is received thereby for automatically disengaging the clutch, engaging the brake and preventing the delivery of the flow of pressurized fluid to the fluid motor.

7. In the transmission of claim 6, the improvement comprising the steps of automatically disengaging the clutch, engaging the brake and preventing the delivery of the flow of pressurized fluid to the fluid motor in a predetermined sequence.

8. In the transmission of claim 6, the improvement comprising the steps of automatically disengaging the clutch, engaging the brake and preventing the delivery of the flow of pressurized fluid to the fluid motor substantially simultaneously.

9. A hydro-mechanical drive, comprising:

a mechanical power source having a rotatable output;

a fluid motor having an output drivingly rotatable by passage of a flow of pressurized fluid from a pressurized fluid source through the motor;

a planetary gear arrangement including a first rotatable input, a second rotatable input, and a rotatable output, the first rotatable input being connected to the output of the fluid motor so as to be rotatably driven by the motor when the flow of pressurized fluid passes therethrough;

a first device operable for connecting the second rotatable input of the gear arrangement in rotatably driven relation to the rotatable output of the mechanical power source and for disconnecting the second input therefrom;

a second device operable when pressurized fluid is received thereby from a pressurized fluid source for connecting the second rotatable input of the gear arrangement to a fixed member for preventing rotation of the second rotatable input; and a controller operable when a predetermined input signal is received thereby for operating the first device for disconnecting the second rotatable input from the mechanical power source and operating the second device for connecting the second rotatable input to the fixed member, and for preventing the flow of the pressurized fluid through the motor so as to prevent drivingly rotating the output thereof, for preventing driven rotation of the inputs of the planetary gear arrangement by the mechanical power source and the fluid motor.

10. The transmission of claim 9, wherein the second rotatable input of the planetary gear arrangement includes a ring gear thereof.

11. The transmission of claim 10, wherein the first rotatable input of the planetary gear arrangement includes a sun gear thereof.

12. The transmission of claim 9, wherein the rotatable output of the planetary gear arrangement is connected to at least one rotatable element of a feeder of an agricultural combine.

13. The transmission of claim 9, wherein the rotatable output of the planetary gear arrangement is connected to a threshing rotor of an agricultural combine.

14. In an agricultural combine having a hydro-mechanical drive for drivingly rotating a rotatable element of the combine, the drive including a rotatable mechanical power source, a fluid power source including a fluid motor which is rotatably driven by passage of a flow of pressurized fluid therethrough, and a planetary gear set including a first rotatable input connected to the fluid motor for rotation thereby, a second rotatable input rotatably connectable by a first device to the mechanical power source, the second rotatable input being connectable to a fixed frame by a second device when pressurized fluid is delivered to the second device, and a rotatable output connected to the rotatable element of the combine, the rotatable element being rotatable by the drive when the first and second rotatable inputs of the planetary gear set are connected to the fluid motor and to the mechanical power source, respectively, an improvement comprising:

a control which when a predetermined input is received thereby automatically causes the first device to disconnect the second rotatable input from the mechanical power source, the second device to connect the second rotatable input to the frame, and any driven rotation of the fluid motor to be prevented, to prevent rotation of the rotatable element by the drive.

15. In the combine of claim 14, the predetermined input comprising a signal representative of a neutral condition.

16. In the combine of claim 14, the improvement further comprising the control being operable for allowing the output of the drive and the rotatable element to be manually rotated in the absence of delivery of pressurized fluid to the second device.

17. In a hydro-mechanical transmission for drivingly rotating at least one rotatable element of an agricultural combine, the transmission including a planetary gear arrangement having a rotatable output, a first rotatable input connected to an output of a fluid motor drivingly rotatable by passage of a flow of pressurized fluid therethrough, and a second rotatable input connectable by a device to a rotatable output of a mechanical power source of the combine, and a second device operable when fluid therein is pressurized for connecting the second rotatable input to a fixed member for preventing rotation of the second rotatable input, an improved method for placing the transmission in a neutral operating condition comprising the steps of:

automatically disconnecting the rotatable output of the mechanical power source from the second rotatable input;

automatically operating the second device so as to connect the second rotatable input to the fixed member to prevent rotation of the second rotatable input; and automatically preventing the passage of a flow of pressurized fluid through the fluid motor so as to prevent the driving rotation thereof when the second rotatable input is disconnected from the rotatable output of the mechanical power source and is connected to the fixed member, such that driving rotation of the transmission is prevented.

18. In the hydro-mechanical transmission of claim 17, the improvement comprising the subsequent step of automatically depressurizing any fluid in the second device when the second rotatable input is disconnected from the mechanical power source and passage of the pressurized fluid through the fluid motor is prevented, so as to release the second rotatable input for allowing manually rotating an output of the transmission.

19. In the transmission of claim 17, the second rotatable input comprising a ring gear of the planetary gear arrangement, and the fixed member comprising a fixed frame member of the transmission or the combine, such that the step of automatically operating the second device comprises connecting the ring gear to the frame member.

20. In the transmission of claim 17, the improvement further comprising the step of providing a controller operable when a predetermined input signal representative of the neutral condition is received thereby for automatically disconnecting the rotatable output of the mechanical power source from the second rotatable input, operating the second device, and preventing the delivery of the flow of pressurized fluid to the fluid motor.

* * * * *